(12) United States Patent
England et al.

(10) Patent No.: US 7,664,949 B2
(45) Date of Patent: Feb. 16, 2010

(54) CERTIFYING AND GROUPING DISTRIBUTED OBJECTS

(75) Inventors: Paul England, Bellevue, WA (US); Muthukrishnan Paramasivam, Seattle, WA (US); Thekkthalackal Varugis Kurien, Sammamish, WA (US); Charles F. Rose, III, Redmond, WA (US); Ravindra N Pandya, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/194,100

(22) Filed: Jul. 29, 2005

(65) Prior Publication Data

US 2007/0028096 A1 Feb. 1, 2007

(51) Int. Cl.
  *H04L 29/06* (2006.01)
(52) U.S. Cl. .......................................... 713/156; 726/2
(58) Field of Classification Search ................ 713/156; 380/277; 705/1; 726/2
  See application file for complete search history.

(56) References Cited

U.S. PATENT DOCUMENTS

| | | | | |
|---|---|---|---|---|
| 7,068,789 B2 * | 6/2006 | Huitema et al. | ............. | 380/277 |
| 7,289,964 B1 * | 10/2007 | Bowman-Amuah | ............ | 705/1 |
| 2003/0093665 A1 * | 5/2003 | Cooper et al. | ............... | 713/156 |
| 2005/0138360 A1 * | 6/2005 | Kamalakantha | ............. | 713/156 |

OTHER PUBLICATIONS

John Linn ; Attribute certification: an enabling technology for delegation and role-based controls in distributed environments;Year of Publication: 1999; pp. 121-130.*

* cited by examiner

*Primary Examiner*—Kambiz Zand
*Assistant Examiner*—Monjour Rahim
(74) *Attorney, Agent, or Firm*—Lee & Hayes, PLLC

(57) ABSTRACT

Disclosed herein is a technique for certifying distributable objects. The technique involves creating a certification for each distributable object to indicate properties of the object. Using certifications such as this, it is possible to accept objects having certain properties only from specified entities.

18 Claims, 3 Drawing Sheets

| Attester | Property |
|----------|----------|
| ABC Corp | Executable |
| XYZ Corp | Executable |
| ... | ... |
| XYZ Corp | Font |

Group A: ABC Corp/Executable, XYZ Corp/Executable
Group B: XYZ Corp/Font

Fig. 3

| Group | Privileges |
|-------|------------|
| A | Read |
| B | Read/Write |

Fig. 4

CERTIFYING AND GROUPING DISTRIBUTED OBJECTS

BACKGROUND

It has become increasingly important to safeguard users from downloaded content that may turn out to be malicious, harmful, or otherwise undesirable. Presently, different types of content or data objects can be certified by trusted entities, and users can choose to accept content only if it is from such trusted entities. This can provide some protection against dangerous content.

Certification of a data or code object, such as an executable program, involves creating a digital certificate to accompany the object. A digital certificate is a compilation of information attested to by an issuer. The attestation can be verified by checking a digital signature that is included with the certificate.

Digital signatures are used to allow verification of the data contained in the certificates. In addition, a certificate can contain a hash of the accompanying data object, which can be verified against the digital object using the public key that is contained in the certificate or by other means. This allows a user of the object to verify that the object is the actual and unaltered object referred to in the certificate.

Before accepting or using a data object, a client evaluates the accompanying certificate to determine if the certificate has been legitimately issued by a trusted entity. This involves checking a digital signature included in the certificate, and in some cases also involves checking an authorizing certificate issued by a "Certifying Authority" or "CA". If the certificate is legitimate, the browser or client can assume that the information contained in the certificate has been authored by the certificate owner and has not been subsequently altered Computers can be configured to accept, load, and/or execute only those data objects accompanied by a certificate from a trusted source, or to at least warn the owner before accepting or using any object that is not accompanied by such a certificate.

SUMMARY

Distributable data and code objects are accompanied by certifications indicating properties of the data objects. Receivers of the objects condition their use of the objects based on the issuer of the certifications in combination with the specified properties. Using this technique, objects of certain types will be used only if they are from certain entities, while objects of other types might be accepted from different entities. In addition, provisions are made for entities to delegate authority for distributing objects of certain types.

Potential users of these data objects can create group definitions, where each group definition consists of one or more constraints involving object properties and the entities attesting to those properties in the accompanying certificates.

BRIEF DESCRIPTION OF THE DRAWINGS

FIG. 3 is a diagrammatic representation of constraint groups.

FIG. 4 is a diagrammatic representation of group privileges.

DETAILED DESCRIPTION

Figures 1, 2:
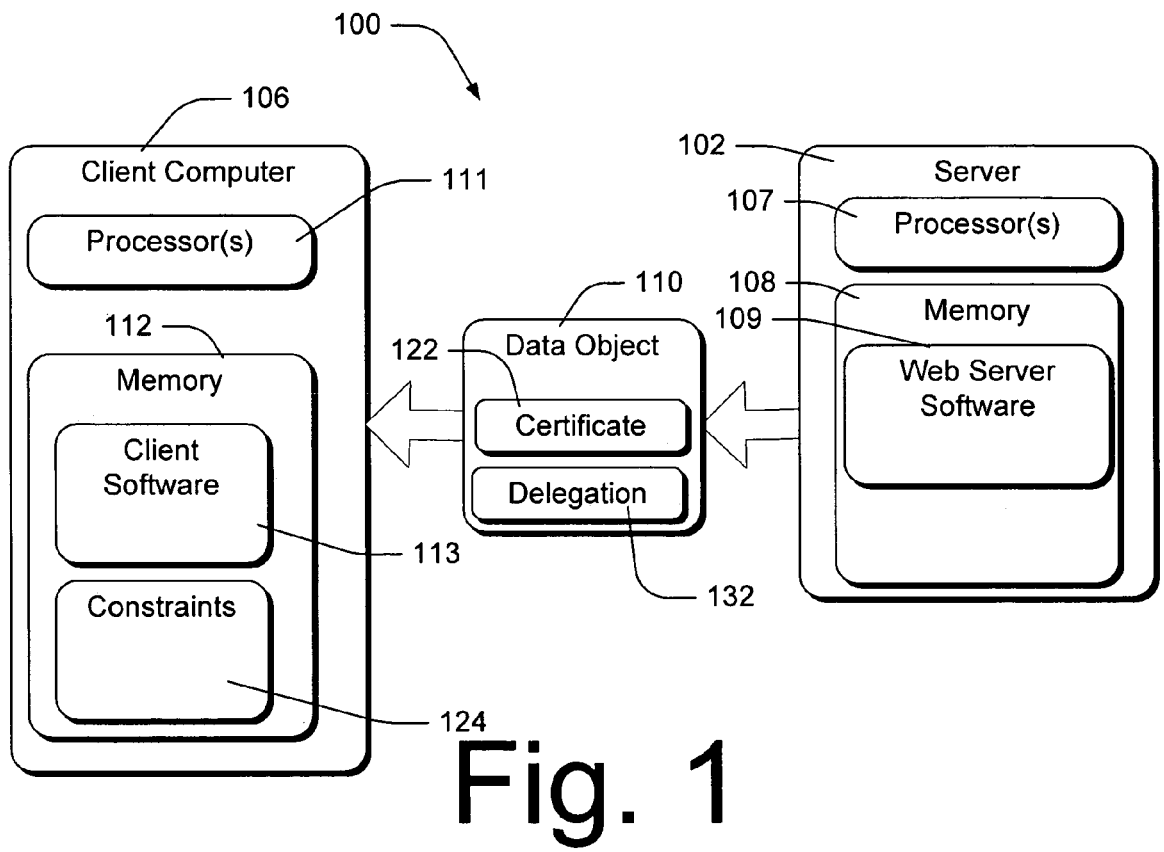
FIG. 1 is a simplified block diagram of a client/server system in which the described techniques can be implemented.
FIG. 2 is a diagrammatic representation of a constraint table.

FIG. 1 illustrates one example of an Internet-based system 100 in which a server 102 is accessible through the Internet or other network (not shown) by one or more clients or client computers 106. In general, a "server" is a source of information, data, or data objects, and a "client" is a consumer of such information, data, or data objects. These roles are not always exclusive, however, and the functions of server and client can be distributed and that information and data may flow in either or both directions. In general, communications between a server and client are usually (but not always) initiated by a client.

Although the Internet is currently the most pervasive public network, the technology described below can be used in other networks or data distribution topologies in which protection from untrusted content is desirable. Furthermore, although the Internet is associated with a known set of communication protocols and standards, the described technology can also be adapted to other protocols and standards. For purposes of clarity, the following discussion is set within the framework of current Internet technologies; however, the invention is not limited to such current Internet technologies.

Server 102 is an Internet or Web server, comprising a single computer or, in some situations, a server farm having multiple computers. Server 102 has one or more processors 107 and computer-readable media or memory 108, including both removable and non-removable memory.

Server 102 has web server software 109, such as a variant of Internet Information Services (IIS), available from Microsoft Corporation. The web server software comprises instructions residing in memory 108, which are executable by the server computer and its processor(s) 107 to perform any of the server-based techniques described below.

Server 102 stores or has access to various content, which it provides to client computers upon request. For purposes of the following discussion, an example of such content is referred to as a data object 110. Data object 110 comprises data, objects, and/or information that the server makes available to requesting clients. Examples include executable programs and components, drivers, controls, resources such as fonts, attachments, and various types of data such as textual or numerical data and images.

Client 106 can be a conventional user-oriented computer such as a desktop computer, a laptop computer, a handheld, an Internet-enabled telephone, or any other device that can issue requests to server 102 and/or receive data from server 102. In this example, client 106 is a typical personal computer having access to the Internet by some means such as telephone modem, cable modem, ISDN, DSL, local area or corporate network, or some other type of persistent or on-demand data connection.

Client 106 has one or more processors 111 and computer-readable media or memory 112 including both removable and non-removable memory. Client 106 has client or browser software 113 such as Internet Explorer, available from Microsoft Corporation. The client software comprises instructions residing in memory 112, which are executable by the client computer and its processor(s) 111 to perform any of the client-based techniques described below.

Browser software such as client software 113 typically allows a user to specify a URL, in response to which the browser takes necessary steps to obtain the information available at that URL and displays the information to the user on a graphics display. Note that the techniques described below can also be used with other types of clients, some of which might not involve user interaction and/or graphic display.

Both server 102 and client 106 have additional software, not shown, such as operating systems, utilities, drivers, etc., which may aid in performance of the techniques described below. Specific responsibility for the described actions may be distributed in many different ways. Furthermore, the described functionality may be implemented either by incorporation with or addition to existing software products, by way of supplemental software that works in conjunction with such existing software products, or as stand-alone products or software modules. In other words, the described techniques can be performed by components other than Internet servers and Internet browsers.

In many cases, data provided by the server is in the form of a data objects designed to be used on the recipient computer apart from the browsing process. Such a data object is shown in FIG. 1, designated by reference numeral 110. For example, such data might comprise an executable program or a computer resource such as a font. These types of data objects are especially dangerous, in that if they are executed or loaded, they can impair client computer operations and in some cases obtain and distribute private or confidential information about the user of the client computer. Even if not actually dangerous, the quality of the objects might vary and a user or developer of an application program might desire to use only resources from vendors our sources that are known to provide quality and reliability.

In order to ensure that downloaded data objects have desired properties, data object 110 is accompanied or associated with a certification 122. Although shown as actually accompanying the data object, certification 122 may be obtained or distributed separately from data object 122. Certification 122 can alternatively be referred to as a property license.

The certification can be generated or formatted in various different ways. In the example described herein, the certification is cryptographically generated as an X.509 certificate or ISO REL license, in conjunction with the existing public key infrastructure (PKI). ISO REL licenses use a format that is capable of specifying constraints on entities authorized by the licenses. Using PKI, the validity of a certificate can be verified through a Certification Authority (CA). Other methods of validating that data originates from a designated source can also be used to verify that the certification is authentic and has truly been generated by a given entity.

In the described embodiment, certification 122 contains at least the three data items:

a description of one or more properties of the associated object;

a verifiable identification of an attesting entity who attests to the description of the object; and a verifiable identification of the object.

The description of object properties might simply comprise one or more property names or descriptors. In many cases, this will be a limited number or subset of the available property types. For example, a property name might be one of the following: "executable", "font", "image", "URL"; or any other designation defined by the entity responsible for the object, indicating a particular property of the object. Alternatively, the description might comprise a property name and an associated value, or a plurality of such pairs of names and values. For example: security_level/medium might indicate that the associated object has a medium security level. Generally, the entity responsible for distributing the object can define appropriate formats and designations for the descriptions of the object properties.

In addition to the description, certification 122 contains an identification of an entity who attests to the accuracy of the description. This will normally be the party responsible for distributing or creating the data object, but could be some other party. In the example discussed herein, this identification consists of the certificate owner or issuer. As discussed above, this identification is verifiable using PKI techniques. Other means of verifying the claimed identity of the certification author can alternatively be used. The certification also contains a verifiable identification of the object to which it refers or with which it is associated. This might include the name of the object or some other description of or reference to the object. In addition, in order to provide verifiability, the identification of the object in this example includes a hash of the object itself. In order to verify the identification of the object, a user or consumer of the object calculates the hash from the received object, and then compares it to the hash contained in the certification. If the two hashes match, the user can conclude that the object is authentic and has not been altered: that the object is the same one described in the certification.

In accordance with digital certificate techniques, the entire certificate is cryptographically signed and is therefore tamperproof. In other words, the information contained within the certificate can be verified to have been created by the entity claiming to have created it, and to have been unaltered since it was created.

The above discussion assumes that users of data objects are able to define exactly which entities are expected to attest to or provide certain types of data objects. However, it is also possible for one entity to delegate authorization to another entity for this purpose. For example, an application program might be designed to recognized "ABC Corp" as a valid provider of fonts (objects having the property "font"). However, it may be useful in some situations for "ABC Corp" to delegate its authority to distribute fonts to "XYZ Corp", and the application program should be able to recognize such a delegation.

In this situation, the data object is accompanied by a certification, as described above, from the entity to whom authority has been delegated—referred to herein as a delegated entity. In addition, this delegated entity provides another certification, provided by the originally recognized entity (ABC Corp in the example above), attesting to the authority delegated to the entity providing the data object. In the example described above, for example, ABC Corp (a delegator) would provide a certification stating that XYZ Corp (a delegated) has delegated authority to distribute data objects having the "font" property. The certification can be in an ISO REL license or any other suitable secure and agreed upon format. FIG. 1 shows such an optional delegation certification, designated by reference numeral 132.

In addition to specifying properties that a delegated entity is authorized to certify, the authorizing certification provided by the originally recognized entity can specify constraints on values of properties that can be delegated. For example, ABC Corp might choose to allow XYZ Corp to distribute object only where the property "CashValue" is between 0 and 5.

Potential users of a data object obtain and inspect the associated certification prior to using the data object. The certification is examined to verify that it actually refers to the received data object, and the hash is calculated and compared as described above to verify that the data object has not been altered. The certification is also examined to determine the properties of the object and the identity of the entity who is attesting to such properties. Once this is determined, the user, or the system on behalf of the user, determines, based on both the properties and the attester to those properties, whether to accept and use the object, and in some cases whether limits should be placed on the privileges granted to the object.

In normal operation, the potential user of the data object will usually be some type of software—an operating system or application program—that is executing on client computer 106. The software will be written or configured to maintain a list or other definition of constraints that qualify privileges that are granted to received data objects. In FIG. 1, such a definition is represented as a table 124 of constraints. In actual implementation, the constraints might be defined by an ISO REL license.

Each constraint comprises the name or identifier of an attester and one or more corresponding properties to which the attester is allowed to attest. Acceptance and use of an object is then conditioned upon receiving a certification from a listed or known attester, indicating properties that are listed in table 124 as being assignable by that attester. Each consumer or user of data objects can be configured differently, with different criteria or constraints. For example, a given application program might be pre-configured to accept and load executable programs only if they are of type "executable", as attested to in a certificate from "ABC Corporation". Another application program might be pre-configured to accept and load similar types of programs only if they have a property of "security_level" equal to "high", as attested to in a certificate from "XYZ Corporation". Some consumers or users of data might require more than one type of property, possibly from more than one attester. In addition, constraints can be defined using Boolean logic combinations of one or more attesters and one or more properties.

The table 124 of constraints can be pre-configured at several different levels. For example, each application program might have a unique set of constraints that it uses to qualify data objects under its control. Alternatively, the list of constraints might operate on a computer or network level to qualify data objects used on a number of different computers within the network.

Furthermore, constraints might be dynamically configured or obtained. For example, a user might enter or edit the conditions that qualify acceptance of data objects. As another alternative, the conditions or constraints might be downloaded from a network source, either periodically or any time a decision is being made whether to accept a certain data object. Other forms might also be available for distributing this type of information.

List 124 might additionally indicate certain rights or privileges that are available to data objects that satisfy given constraints. For example, data objects of type "executable" from "ABC Corporation" might be allowed only limited access to computer resources, such as read-only access, while the same type "executable" from "XYZ Corporation" might be allowed greater access to those resources, such as read-write access.

FIG. 2 shows one example of how such a table 124 might be organized. In this example, the table of constraints comprises multiple rows, with each row having three fields or columns. The first field 126 comprises an "attester" field, indicating the name of an entity. The second field comprises a "property" field 128, indicating a property corresponding to the attester. This indicates that data objects from the attester of the indicated data type will be accepted, subject to privileges or rights that are specified in a third "privileges" field 130. Even when a data object qualifies under one of the rows of table 124, it is given only those privileges indicated in the "privileges" field. Note that some embodiments may not include the "privileges" field, and may grant the same set of privileges to any data objects that satisfy the constraints of the first two fields.

FIG. 2 is just one of many different ways in which constraints might be defined. As an alternative, constraints may be defined by an ISO REL data structure.

Grouping is another technique that can be employed by users or receivers of data objects to define privileges allowed to received data objects. Using this technique, several constraints can be combined and referred to by a group name or identifier.

FIG. 3 shows an example of constraints that are assigned to groups, in this case to groups A and B. Multiple constraints are associated with each group. In this example, meeting any one of the constraints of a group will qualify a received data object to be in that group.

When using groups, privileges can be associated with groups of constraints rather than with individual constraints. FIG. 4 shows such an association of groups with privileges, in which a specification of privileges is assigned to each available group.

Rather than the simplified table arrangement of FIG. 3, groups can be defined as Boolean combinations of constraints, and other forms of definitions can also be used. In addition, group identifiers can be derived from the group definitions themselves. For example, assuming that each group definition is a textual Boolean statement specifying a logical combination of attesters and properties, the group identifier corresponding to that group can be a hash of the textual Boolean statement that defines the group. When the group identifier is used across a network, this allows individual computers or computing entities to check the group identifier against the group constraint definition to ensure that the definition has not been altered. Furthermore, when this expression is written is normalized according to well-known algorithms, there is a one-to-one correspondence between the group name and the expression that defines the group.

Assuming perfect hashing, the name of such a group is cryptographically un-ambiguous, in contrast to other group definitions that are commonly used to grant privileges. Consequently, such groups can be used as the basis of distributed access control.

In addition, groups can be defined as logical combinations of other groups. When using Boolean logic, two group definitions can be OR'd or AND'd to form another group definition. Furthermore, such groups can be named by hashing the individual names or by hashing the names after combining them.

It is possible to combine this form of grouping system with the access control, authorization and auditing function of modern operating systems since such systems typically have a Security Reference Monitor for centralizing policy decisions. The Security Reference Monitor will make calls to the group management system which returns status on whether a particular object satisfies a group definition or not. The Security Reference Monitor then uses this information as part of an access control decision. Consequently, it is possible to "enlighten" the Security Reference Monitor of a modern operating system in order to support distributed access control decisions.

As with individual constraints, groups can be defined at an application level, at a computer level, at a network level, or at any other desired level of organization. They can be authored or defined by an individual user of a computer, distributed from a central authority, or predefined within consuming or rendering software modules.

Furthermore, delegation can be recursive. Specifically, authorization for a particular type of property can be delegated from A to B, and then from B to C.

Figure 5:
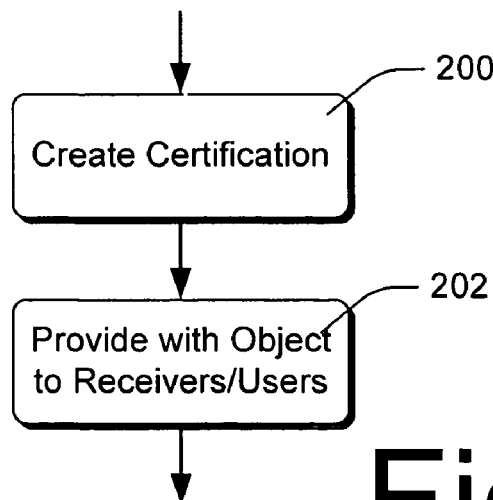
FIGS. 5 and 6 are flowcharts illustrating methodological aspects of the technologies described herein.

FIG. 5 shows methodological aspects performed by a server of distributable objects and/or by attesters to properties of such objects.

Block 200 comprises creating a certification for each distributable object. As already described, the certification contains:

- a description of one or more properties of the associated object;
- a verifiable identification of an attesting entity who attests to the description of the object; and
- a verifiable identification of the object.

More specifically, creating the certification comprises creating a cryptographic certificate from the attesting entity, where the verifiable identification of the distributable object comprises a hash of the distributable object. The certificate can be an X.509 certificate, or ISO REL license, or some other type of data structure that provides the indicated information in a form that can be verified as having come unaltered from the claimed source. Optionally, the certification can reference a delegating entity—or an authorization or certificate of a delegating entity—that has authorized the attesting entity to attest to the description. Such an authorization or certificate of a delegating entity may also indicate the properties or types of properties to which the attesting entity is authorized to attest.

Block 202 comprises making the certification available to potential users of the distributable object. The certification can accompany the distributable object, or can be separately provided.

Figure 6:
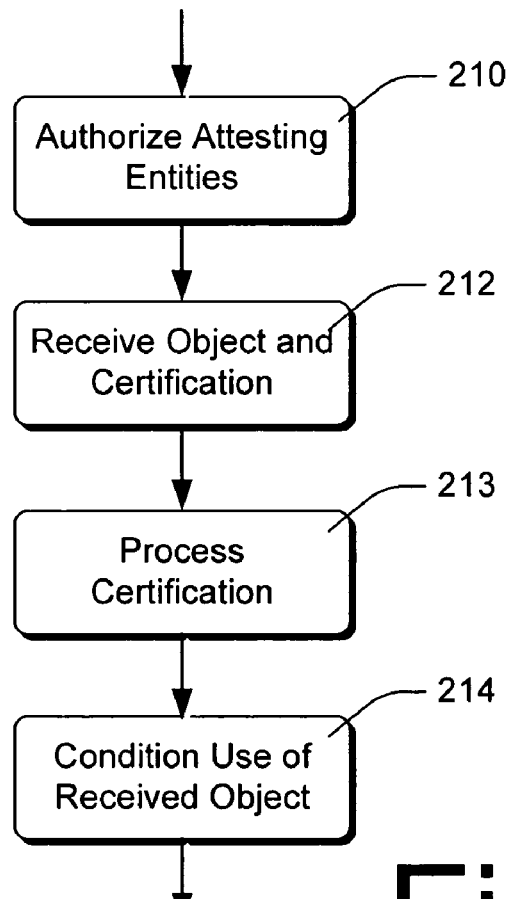

FIG. 6 shows methodological aspects performed by a receiver or potential user of distributable objects. Block 210 comprises authorizing different entities to attest to different properties of the distributable objects. In the described implementation, this comprises maintaining some kind of listing or definition of constraints, each constraint indicating an attesting entity and the properties or types of properties to which the entity is allowed to attest. This may comprise maintaining object group definitions, wherein each object group definition comprises one or more constraints. The group definitions can be expressed as Boolean logic statements. This may also comprise associating one or more permissions with each group definition, and creating a group identifier corresponding to each group definition. The group identifier is based on a hash of the group definition statement.

Block 212 comprises obtaining a distributable data object and an accompanying certification corresponding to the data object. Each certification comprises data elements as already described.

Block 213 comprises processing the received certification to determine properties of the obtained data object. This step also comprises determining whether the distributing entity is authorized to distribute objects with the specified properties, either directly or through delegation. Authorizing typically involves some sort of data structure indicating which entities are authorized to distribute different types of objects, and which entities are authorized to delegate authorization of objects having identified properties.

Block 214 comprises conditioning use of distributable data objects based on the properties of the objects and the identities of the entities who attest to those properties. Stated alternatively, block 214 comprises using any particular object only if its certification indicates that it meets one of a plurality of constraints, where each constraint comprising one or more properties and one or more entities that are authorized to attest to those properties. This includes recognizing an attesting entity as being authorized to attest to a particular property if it has authorization from a delegating entity that is authorized to attest to that particular property. When using group definitions, this comprises granting permissions to a distributable object only if its certification satisfies the constraints of a group definition that is associated with those permissions.

The invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of certifying a distributable object, comprising:
   creating a certification for each distributable object using a computer, the certification containing:
   a description of one or more properties of the distributable object including at least one property of the distributable object other than those properties which are indicative of a source of the distributable object;
   a verifiable identification of an attesting entity who attests to said description; and
   a verifiable identification of the distributable object;
   making the certification available to potential users of the distributable object;
   referencing an authorization from a delegating entity in the certification using the computer, wherein the authorization authorizes the attesting entity to attest to one or more types of properties of the distributable object; and
   conditioning use of the distributable object based on the property of the distributable object other than those properties which are indicative of the source of the distributable object and based on the identities of the entity who attests to those properties using the computer.

2. A method as recited in claim 1, wherein the authorization authorizes the attesting entity to attest to a limited number of properties of the distributable objects.

3. A method as recited in claim 1, wherein creating the certification comprises creating a cryptographic certificate from the attesting entity, the verifiable identification of the distributable object comprising a hash of the distributable object.

4. A method as recited in claim 1, the authorized types of properties of the distributable objects being specified by said authorization.

5. A method of certifying distributable objects, comprising:
   authorizing different entities to attest to different properties of the distributable objects using a computer;
   authorizing, using the computer, said different entities to authorize delegated entities to attest to sub-sets of the different properties of the distributable objects to which said different entities are authorized to attest;
   said properties of the distributable objects, including at least one property of the distributable object other than those properties which are indicative of a source of the distributable object, being attested to in certifications corresponding to the distributable objects; and
   conditioning use of the distributable objects based on the property of the distributable object other than those properties which are indicative of the source of the distributable objects and based on the identities of the entities who attest to the property of the distributable object other than the source of the distributable object using the computer.

6. A method as recited in claim 5, wherein a certification of a particular distributable object comprises:
   a description of one or more properties of the particular distributable object;
   a verifiable identification of the attesting entity who attests to said description; and
   a verifiable identification of the distributable object.

7. A method as recited in claim 5, further comprising:
   creating object groups using the computer, wherein a distributable object is a member of a group if its certification satisfies specified constraints; and
   conditioning use of distributable objects depending on whether the distributable objects are members of one or more of the object groups using the computer.

8. A method as recited in claim 7, wherein an individual constraint comprises a particular property of the distributable objects and an authorizing entity.

9. A method of qualifying distributable objects before using them, comprising:
   obtaining the distributable objects accompanied by certifications corresponding to the distributable objects using a computer, each certification comprising:
   a description of one or more properties of the distributable object corresponding to the certification including at least one property of the distributable object other than those properties which are indicative of a source of the distributable object wherein the property of the distributable object other than those properties which are indicative of a source of the distributable object indicate at least one of whether the distributable object is executable, whether the distributable object is a font, whether the distributable object is an image; or whether the distributable object is an URL (Uniform resource Locator);
   a verifiable identification of the attesting entity who attests to said description; and
   a verifiable identification of the distributable object;
   using any particular object if its certification indicates it meets one of a plurality of constraints, at least one constraint comprising one or more properties of the distributable objects and one or more entities that are authorized to attest to said one or more properties of the distributable objects and at least one constraint comprising the property of the particular distributable object other than those properties which are indicative of a source of the particular distributable object using the computer.

10. A method as recited in claim 9, further comprising maintaining a list of said constraints using the computer.

11. A method as recited in claim 9, further comprising recognizing an attesting entity as being authorized to attest to a particular property of the distributable objects if it has authorization from a delegating entity that is authorized to attest to said particular property of the distributable objects using the computer.

12. A method as recited in claim 9, wherein the certification comprises a cryptographic certificate, the verifiable identification of the distributable object comprising a hash of the distributable object.

13. A method as recited in claim 9, further comprising:
   maintaining object group definitions using the computer, wherein each object group definition comprises one or more of the constraints;
   associating one or more permissions with each group definition using the computer;
   granting permissions to a distributable object only if its certification satisfies the constraints of a group definition that is associated with those permissions using the computer.

14. A method as recited in claim 9, further comprising:
   maintaining object group definitions as Boolean combinations of the constraints using the computer;
   associating one or more permissions with each group definition using the computer;
   granting permissions to a distributable object only if its certification satisfies the constraints of a group definition that is associated with those permissions using the computer.

15. A method as recited in claim 9, further comprising:
   maintaining object group definitions using the computer, wherein each object group definition comprises one or more of the constraints;
   associating one or more permissions with each group definition using the computer;
   granting permissions to a distributable object only if its certification satisfies the constraints of a group definition that is associated with those permissions using the computer; and
   creating a group identifier corresponding to each group definition using the computer, the group identifier being based on a hash of the group definition.

16. A method as recited in claim 9, further comprising:
   maintaining object group definitions using the computer, wherein each object group definition comprises one or more of the constraints;
   associating one or more permissions with each group definition using the computer;
   assigning an unambiguous group identifier to each group definition using the computer; and
   granting permissions to a distributable object only if its certification satisfies the constraints of a group definition that is associated with those permissions using the computer.

17. A method as recited in claim 9, further comprising:
   maintaining object group definitions using the computer, wherein each object group definition comprises one or more of the constraints;
   associating one or more permissions with each group definition using the computer;
   assigning an unambiguous group identifier to each group definition using the computer;
   granting permissions to a distributable object only if its certification satisfies the constraints of a group definition that is associated with those permissions using the computer; and
   using the group identifiers to control access using the computer.

18. A method as recited in claim 9, further comprising:
   maintaining object group definitions using the computer, wherein each object group definition comprises one or more of the constraints;
   associating one or more permissions with each group definition using the computer;
   granting permissions to a distributable object only if its certification satisfies the constraints of a group definition that is associated with those permissions using the computer; and
   creating a group identifier corresponding to each group definition using the computer, the group identifier being based on a hash of the group definition;
   wherein at least some of the object group definitions are combinations of other object group definitions.

* * * * *